Feb. 6, 1962     R. E. SAUZEDDE     3,019,871

ONE WAY CLUTCHES

Filed Aug. 7, 1958

INVENTOR.

*Rene E. Sauzedde*

BY *Edward K. Goodrich.*

HIS ATTORNEY

United States Patent Office 3,019,871
Patented Feb. 6, 1962

3,019,871
ONE WAY CLUTCHES
Rene E. Sauzedde, Terryville, Conn., assignor to General Motors Corporation, Detroit, Mich., a corporation of Delaware
Filed Aug. 7, 1958, Ser. No. 753,782
3 Claims. (Cl. 192—41)

This invention relates to one way clutches and particularly to a clutch which avoids shock loading when initially transmitting rotation between a pair of relatively rotatable members.

It is common practice to employ a mechanical clutch for transmitting the rotation between a driving and a driven member. Such a clutch usually transmits this rotation through a toothed engagement of a clutch member with one or both of the relatively rotatable members. When such a clutch engages between a rotating and a non-rotating member or even between a pair of rotating members which are rotating at different rates, there is an abrupt and sudden shock load transmitted to the driven member. This shock load is very objectionable and often is injurious to the clutch parts as well as to the mechanism associated with the clutch. Consequently, it has been found necessary in many instances to engage a clutch between a driven and driving member while both members are stationary or while the relative rotation between said members is small. To avoid this objectionable shock load when such a clutch is suddenly engaged, many clutches employ complicated constructions involving frictionally engaged face plates which are gradually forced into sliding and driven engagement with each other. However, such a clutch construction heats objectionably and is subject to considerable wear.

It is, therefore, an object of this invention to provide an improved one-way clutch of simple construction which yieldably but positively enters into driving relation between the relatively rotatable members.

Another object is to provide an improved clutch wherein a driving member detachably and resiliently engages into a positive uni-directional driving relation between a pair of relatively rotatable members.

Another object resides in the provision of an improved one-way clutch and coaxial bearing assembly having a resiliently yieldable and positive driving connection for engagement between the relatively rotatable members.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 1:
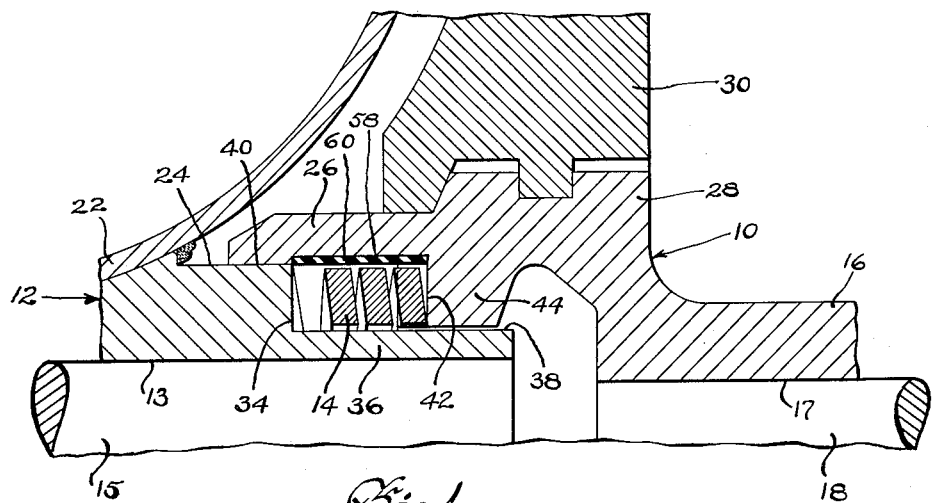
FIGURE 1 is a fragmentary cross sectional view of the invention.
Figure 2:
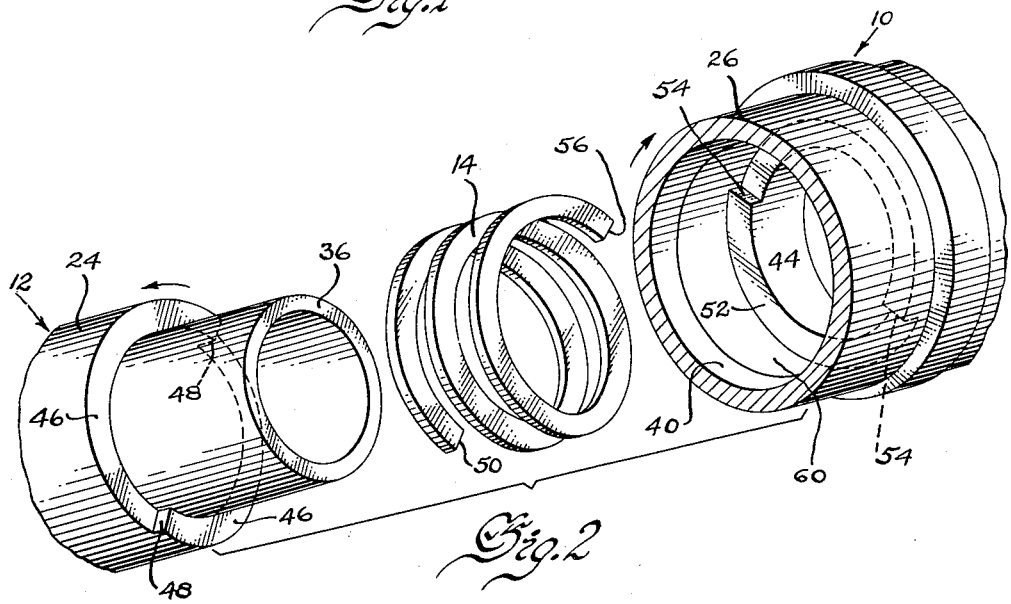
FIGURE 2 is an exploded perspective view.

My improved clutch includes a driving member 10 and a driven member 12 in coaxial journalled relation and in one way clutch driving relation through an intervening torsion spring 14. The driving member 10 has a hub portion 16 provided with a central bore 17 receiving a drive shaft 18 which may be suitably secured to the hub 16 as by a key (not shown). The driven member 12 has a central bore 13 coaxial with the bore 17 and receiving a driven shaft 15 which may be suitably secured to the member 12 as by a key (not shown). For purposes of illustration, the member 12 is shown as supporting a transmission rotor 22. However, it will be appreciated that the member 12 may support and drive any member desired. The member 12 is provided with a hub having a cylindrical bearing surface 24 upon which is rotatably journalled a sleeve portion 26 of the member 10. The driving member 10 has an intermediate enlarged annular portion 28 which may be employed to support and rotate any suitable member such as a transmission member 30. If desired, the hub portion 16 may be journalled for free rotation upon the shaft 18 and the member 30 or other suitable member mounted on the enlarged portion 28 may impart the rotational driving relation to the driving member 10.

The inner end of the cylindrical bearing surface 24 terminates in a substantially radial annular wall 34 from which axially extends a reduced sleeve portion 36 having a cylindrical outer surface 38. The bore 40 of the sleeve extension 26 terminates at its inner end in an annularly extending generally radial wall 42 on an inner annular projection 44 whose bore slightly exceeds the diameter of the cylindrical surface 38. The annular wall 34 of the driven member 12 is provided with two or more arcuate camming surfaces as 46 which gradually axially advance toward the driven member 10 and terminate in spaced relation in generally radial shoulders 48 for detachable ratchet-toothed clutching engagement with a squared-off end surface 50 of the torsion spring 14.

Figure 3:
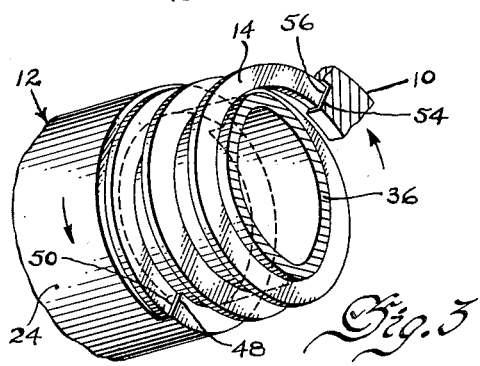
FIGURE 3 is a fragmentary perspective view with parts broken away to show their operative relation.

Similarly, the annular wall 42 at the inner end of the bore 40 in the sleeve portion 26 has a pair of circumferentially disposed arcuate cam faces 52 which axially advance towards the driven member 12 and terminate in spaced relation in a pair of generally radial shoulders 54 for selective ratchet-toothed engagement with an end abutting shoulder 56 on the torsion spring 14. The arcuate rising surfaces 46 and 52 and their associated radial shoulders 48 and 54 are in opposing relation to each other to provide a torsional drive from the driving member 10 through the spring 14 to the driven member 12 as best illustrated in FIGURE 3. It will be appreciated that for convenience of illustration, that only two diametrically opposed driven shoulders 48 and two diametrically opposed driving shoulders 54 are shown. However, the invention contemplates a construction wherein any suitable number of circumferentially spaced driving or driven shoulders may be employed for engagement with the ends of the driving spring 14. This spring 14 may be of conventional, open-wound form made from wire of circular cross section or may be of rectangular cross section as shown. In either event, the inner diameter of the spring appreciably exceeds the outer diameter of the cylindrical surface 38 on the sleeve portion 36 and the outer diameter of the spring is preferably slightly less than the diameter of the bore 40 in the sleeve extension 26.

With the parts constructed as shown, when a clockwise rotation is imparted to the driving member 10, one of the shoulders 54 engages the end 56 of the spring 14 which is normally slightly compressed between the annular end walls 56 and 42. Continued rotation of the driving member 10 causes the now rotating spring to have its other end face 50 enter into driving engagement with one of the faces 48 imparting a similar direction of rotation to the driven member 12. Due to the inherent yieldable characteristics of the torsion spring 14, it will slightly give, increase in diameter and yieldably impart rotation to the driven member 12 thus avoiding the objectionable condition of shock load starting. The torsional tension imparted to the spring 14 will cause it to radially expand into lightly binding engagement with the wall 40. Due to the fact that the spring 14 is openly wound, with axially spaced convolutions, the rotatable driving force imparted to the driven member 12 will have a slightly yieldable characteristic thus avoiding breakage of parts and still imparting a positive drive from the member 10 to the member 12. A reversed rotation of the driving member 10 or a rotation of the driven member 12 in a driven direction but at a faster rate of rotation than the member 10, will cause the cam portions as 46 and/or 52 to lift one or both spring ends from driving relation and no drive will be imparted from the driving member 10 to the driven member 12. Also, it will be appreciated with my construction, if desired, that a reversed unidirectional driving relation may be imparted from the member 12 through the torsion spring 14 to the member 10. The shafts 15 and 18 or other suitable members locate the driving and driven members 10 and 12 in fixed axial relation to each other.

If desired, the sleeve portion 26 of the bore 40 between the walls 34 and 42 may be radially undercut to provide an annular groove 58 in which may be cemented or molded an inherently resilient rubber-like sleeve 60 to further yieldably control the radial expansion of the spring 14 and aid in the yieldable driving transmission through the spring 14. Also, it has been found that the rubber-like sleeve 60 materially aids in reducing any vibration tendencies within the spring.

I claim:

1. A one-way clutch comprising a rotatable driving member, a rotatable driven member, said members being arranged to be selectively rotated in opposite directions, one of said members being rotatably journalled on said other member, a coiled torsion driving spring located radially between said members and having ends resiliently and respectively engaging said members, a uni-directional driving connection between one of the members and the spring, a shouldered portion on the other member detachably engageable with an end of the spring for a uni-directional driving relation, means adjacent the shouldered portion for disengaging the driving relation when the relative rotation between the driving and driven members is reversed, and an annular rubber-like resilient sleeve surrounding the spring and mounted on one of said members for yieldably cushioning the radial spring expansion during a driving relation between said members.

2. A one-way clutch comprising a rotatable driving member, a rotatable driven member, one of said members having an axially extending sleeve portion journalled on said other member, an open coiled torsion driving spring between said members and loosely received within the sleeve portion, the spring having end portions yieldably engaging substantially radially annular walls on said members, a driving connection between one spring end and one of said walls, said other wall having a plurality of shouldered portions for ratchet engagement with the spring in one direction of rotation, arcuate cam portions formed on said walls between said shoulders and disengaging the driving connection with the spring in the other direction of rotation, the sleeve portion having an annular recess, and an inherently resilient rubber-like member in said recess and surrounding the spring, said resilient member yieldably cushioning radial expansion of the spring when driving load is imparted between the driving and driven members.

3. In a one-way clutch, a rotatable driving member, a rotatable driven member, said members being arranged to be selectively rotated in opposite directions, a hub on one of said members, a reduced sleeve portion integral with and projecting from the hub, an outer sleeve portion on the other member in surrounding radially spaced relation to the reduced sleeve portion and journalled on said hub, an annular cam portion on said other member surrounding the reduced sleeve portion in spaced relation, said hub having an annular extending cam portion within the outer sleeve portion, an open-coiled torsion driving spring loosely received between said sleeve portions, the spring having end turns respectively in yieldable engagement with said annular cam portions, each cam portion having a plurality of circumferentially spaced generally radial shoulders for one-way ratchet-driving connection wtih one of the spring ends, the outer sleeve portion between said cam portions being provided with an annular recess surrounding the spring and an annular resiliently compressible rubber-like cushion within said annular recess surrounding the spring, said resilient cushion dampening the spring action under sudden shock load.

References Cited in the file of this patent

UNITED STATES PATENTS

| 1,346,078 | Couch | July 6, 1920 |
| 1,714,496 | Chilton | May 28, 1929 |

FOREIGN PATENTS

| 197,178 | Great Britain | May 10, 1923 |
| 755,405 | France | Sept. 4, 1933 |
| 1,166,870 | France | June 30, 1958 |